INVENTORS
CHARLES HERBERT QUINTON FIFIELD
DEREK RANDALL SMITH
JOHN ALBERT ROBINSON

BY Lawson and Taylor

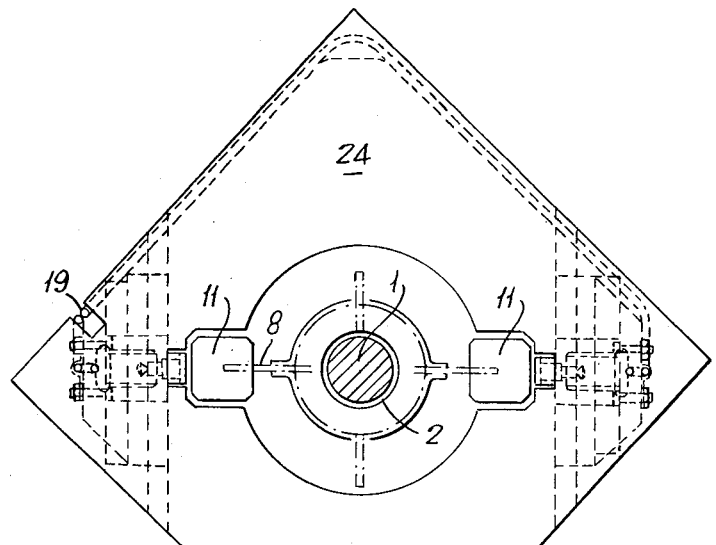
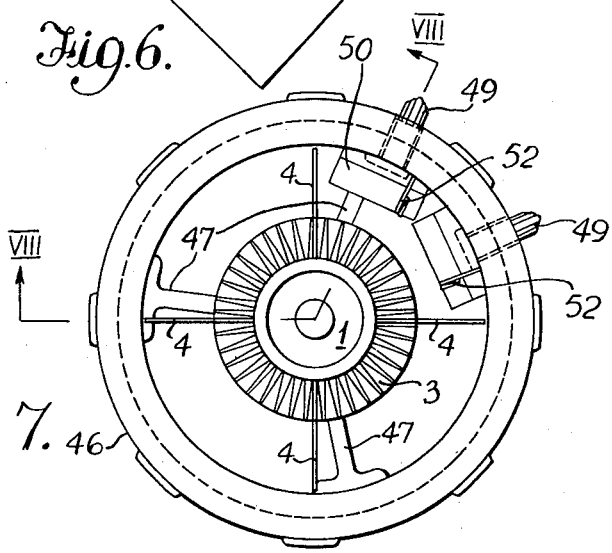

INVENTORS
CHARLES HERBERT QUINTON FIFIELD
DEREK RANDALL SMITH
JOHN ALBERT ROBINSON

BY Larson and Taylor

United States Patent Office 3,021,274
Patented Feb. 13, 1962

3,021,274
TEMPERATURE MEASURING APPARATUS FOR FUEL ELEMENTS OF NUCLEAR REACTORS
Charles Herbert Quinton Fifield, Wilmslow, Derek Randall Smith, Sale, and John Albert Robinson, Wincham, Northwich, England, assignors to A. E. I.-John Thompson Nuclear Energy Company Limited, London, England, a British company
Filed Feb. 9, 1959, Ser. No. 792,162
Claims priority, application Great Britain Feb. 12, 1958
4 Claims. (Cl. 204—193.2)

This invention relates to temperature measuring apparatus for fuel elements of nuclear reactors. The invention has an important application inter alia in gas cooled reactors of the kind in which the fuel elements are mounted in carriers located in passages in a solid moderator, e.g. graphite.

With such reactors it follows that should any danger conditions arise these will produce excess temperatures in the zones in which they occur. It is, therefore, desirable to keep periodic or even continuous track of the temperatures reached in the fuel elements throughout the reactor and especially in the fuel elements situated in the central zones where the highest temperatures are likely to be reached. Clearly information regarding the temperatures reached must be available outside the reactor.

The main object of the invention is to provide apparatus for carrying out such temperature measurement.

According to the present invention fuel temperature measuring apparatus in a nuclear reactor of the kind in which the fuel elements are supported in carriers comprises one or more thermo-couples inserted in the metal of the canning around a fuel element, electrical leads between the thermo-couple or thermo-couples and spring pressed contact plungers extending laterally outwards from the fuel element carrier, ceramic blocks located between moderator blocks bordering the fuel passages which ceramic blocks carry contact strips over which the plungers slide, ramp surfaces above and below said contact strips and leads extending from said contact strips to measuring points external to the core, the materials of the electric circuit within the core being chosen to avoid spurious thermo-couples, (i.e. other than at the measuring point) at temperatures likely to be reached in the core.

In order that the invention may be more clearly understood reference will now be made to the accompanying drawings, in which:

FIG. 6 is a plan view on the line VI—VI of FIG. 5.

FIG. 7 is a plan view of a fuel element supported in a hollow graphite cylinder and embodying the invention.

Figures 1, 2, 3, 4:
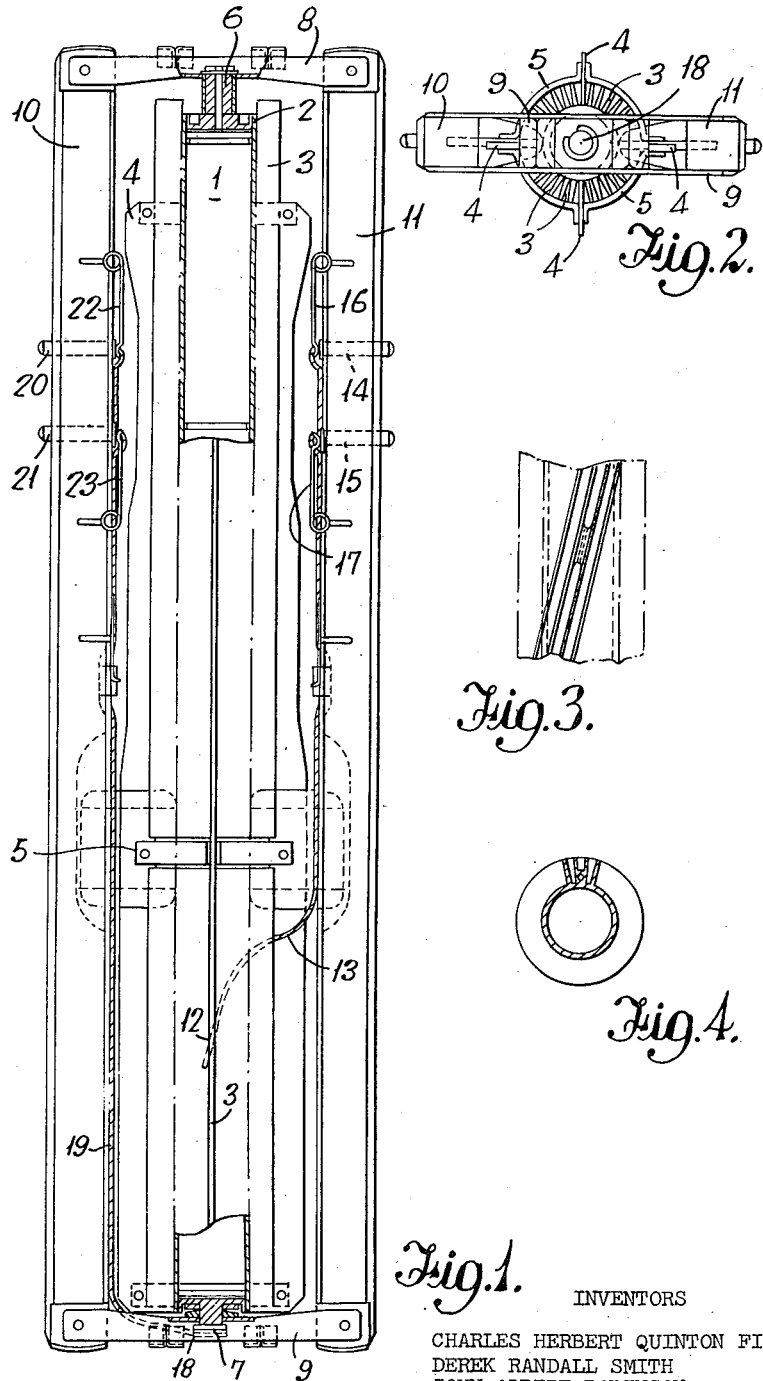
FIG. 1 is a vertical sectional view of a fuel element in a carrier.
FIG. 2 is an underneath plan view of the apparatus shown in FIG. 1.
FIGS. 3 and 4 show a method of fixing the thermo-couple to the fuel can.

In FIG. 1 the fuel element 1 is provided with canning 2 having for example radial fins 3 extending longitudinally. In addition to the fins there are four longitudinal ribs 4 located between the fins 3 whilst a central band 5 extends around the ribs. The upper and lower ends of the fuel elements are provided with plugs 6 and 7 respectively and these are secured in horizontal support members 8 and 9 respectively of the fuel element carrier. The ends of the support members are secured to vertical pillars 10 and 11 which are preferably of graphite.

In the particular arrangement under consideration and as shown in FIG. 6, the fuel channels are circular with diametrically opposite guide channels in which the pillars 10 and 11 slide so as to maintain the orientation of the fuel elements.

As shown in FIG. 1, one of the thermo-couple measuring devices 12 extends through the front rib 4, and the lead 13 extends from the device 12 up the side of the fuel element to spring pressed plungers 14 and 15 extending through the pillar 11 and projecting outwardly therefrom. The plungers 14 and 15 are pressed outwardly by springs 16 and 17 respectively as clearly shown in the figure. A second thermo-couple 18 is attached to the horizontal support member 9 and the lead 19 therefrom extends up the left side of the fuel element as viewed in FIG. 1 to the plungers 20 and 21 respectively which are spring pressed outwardly by the springs 22 and 23.

Figure 5:
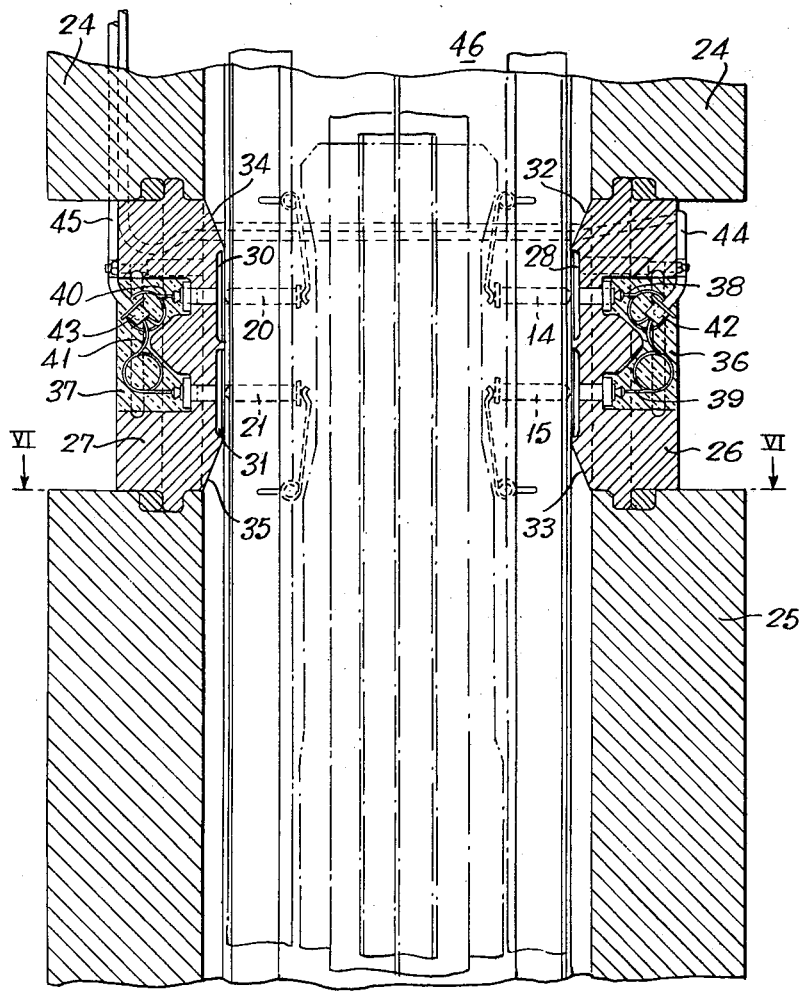
FIG. 5 is a vertical sectional view showing the fixed contacts around the fuel channel.

The fixed contacts in the fuel channel which are engaged by the spring pressed contacts 14, 15 and 20, 21 are shown more clearly in FIGS. 5 and 6. In FIG. 5 the references 24 and 25 indicate two graphite blocks placed one over the other and between the graphite blocks are a pair of ceramic blocks 26 and 27 located on opposite sides of the fuel channel space 46. On its inner face the ceramic block 26 carries fixed contacts 28, 29. Similarly the block 27 carries fixed contacts 30, 31 on its inner side. These fixed contacts are engaged by the spring pressed plungers 14, 15 and 20, 21 respectively. Above and below the fixed contacts are ramp surfaces 32 and 33 along which the contact pins ride and are thereby compressed before they engage the fixed contacts. The spaces 36 and 37 are filled with glass and leads 38, 39 on the right side and 40, 41 on the left side are brought out from the fixed contacts and passed through guide collars 42, 43 into the sheathed elements 44, 45, the ends of the sheaths of which are sealed by the glass filling of the spaces 36 and 37.

In carrying out the invention the thermo-couples may conveniently be nickel-chromium or nickel-aluminium; the contact plungers on the fuel carrier may for example be platinum, irridium or other rare metals such as rhodium provided they do not oxidise excessively at high temperature. The fixed contacts preferably are of the same metal.

The fixed and moving contact materials should in addition to high oxidation resistance have roughly equal contact potentials to the thermo-couple conductor, and it may be preferable to choose different materials for the contacts attached to the nickel chromium to those attached to the nickel aluminum conductors.

Figure 8:
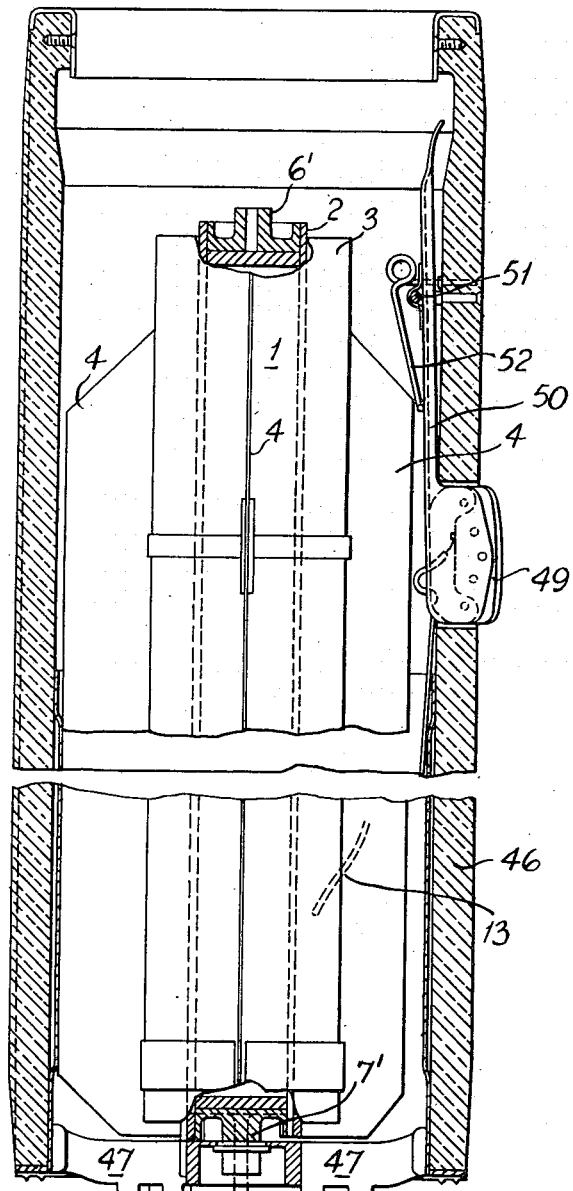
FIG. 8 is a vertical section on the line VIII—VIII of FIG. 7.

FIGS. 7 and 8 show the invention applied to a modified construction of fuel element, FIG. 7 being a plan view and FIG. 8 a vertical section on the line VIII—VIII of FIG. 7.

In the construction shown the fuel carrier is replaced by a hollow graphite cylinder 46 in which the fuel element 1 is supported by a spider construction 47 at the base and lateral movement is prevented by the edges of the ribs 4 abutting against the inside of the graphite cylinder 46.

The spring pressed contact pins of the previous arrangement are replaced by contacts 49 carried on rocker arms 50. These arms are pivoted on U-shaped members 51 and are spring pressed outwardly by springs 52. The outer surfaces of the contacts 49 are suitably contoured to engage fixed contacts in the wall of the fuel passage.

What we claim is:
1. In a nuclear reactor having fuel element supported in carriers located in fuel channels, fuel temperature measuring apparatus comprising at least one thermo-couple inserted in the metal of the canning around a fuel element, laterally displaceable contact members located in the carrier supporting the fuel element and electrically connected with the thermo-couple, spring biasing means urging said contact members laterally outwards from the carrier, contact strips mounted on the face of the fuel channel wall and positioned to engage the contact members, ramp surfaces located above and below said contact strips for guiding the contact members to engage the contact strips when a fuel element is raised or lowered, and electrical connections between said contact strips and measuring apparatus external to the reactor.

2. In a nuclear reactor having fuel elements supported in carriers located in vertical fuel channels, said carriers comprising vertical pillars on opposite sides of the fuel element and cross-members interconnecting the top and bottom ends of said pillars respectively and supporting the fuel element, fuel temperature-measuring apparatus including at least one thermo-couple inserted in the metal of the canning around the fuel element, horizontally displaceable contact members located in apertures in said vertical pillars of the carrier and electrically connected with the thermo-couple, spring biassing means urging said contact members outwards from the carrier, contact strips mounted on the face of the fuel channel wall and positioned to engage said contact members, ramp surfaces located above and below said contact strips for guiding the contact members on to the contact strips when the fuel elements are raised and lowered, and electrical connections between said contact strips and measuring apparatus external to the reactor.

3. In a nuclear reactor having fuel elements supported in carriers located in vertical fuel channels, said carriers comprising hollow cylindrical walls of moderator material, fuel temperature-measuring apparatus including at least one thermo-couple inserted in the metal of the canning around a fuel element, horizontally displaceable contact members located in apertures in the wall of said carrier and electrically connected with said thermo-couple, means for urging said contact members to protrude laterally outwards from the carrier wall, co-operating contact strips mounted on the face of the fuel channel wall, ramp surfaces located above and below said contact strips for guiding the contact members on to the contact strips when the fuel elements are raised and lowered, and electrical connections between said contact strips and measuring apparatus external to the reactor.

4. In a nuclear reactor having a core of graphite blocks and fuel elements supported in carriers located in vertical fuel channels extending through said graphite blocks, temperature-measuring apparatus including at least one thermo-couple inserted in the metal of the canning around a fuel element, horizontally displaceable contact members located in the carrier of the fuel element and electrically connected with said thermo-couple, spring biassing means urging said contact members outwards from the carrier, at least two ceramic blocks interposed between adjacent graphite blocks in the wall of the fuel channel, co-operating contact strips mounted on the face of at least one of said ceramic blocks in line with the fuel channel wall and positioned to engage the contact members, ramp surfaces located above and below said contact strips for guiding the contact members on to the contact strips, and electrical connections between said contact strips and measuring apparatus external to the reactor.

References Cited in the file of this patent
UNITED STATES PATENTS 2,856,341    Kanne    Oct. 14, 1958
2,863,815    Moore et al.    Dec. 9, 1958

OTHER REFERENCES

IDO–16388, Feb. 15, 1957.
ORNL–1537, Mar. 11, 1954. In particular, page 5.